United States Patent [19]

Phripp et al.

[11] 4,134,165

[45] Jan. 16, 1979

[54] FLUSH TOILET ACCESSORY

[76] Inventors: Clarence F. Phripp, R.R. #1, St. Clements, Ontario, Canada, N0B 2M0; Norman R. Preston, 169 Ross Ave., Kitchener, Ontario, Canada, N2A 1V5

[21] Appl. No.: 890,614

[22] Filed: Mar. 20, 1978

[51] Int. Cl.² ............................................. E03D 1/35
[52] U.S. Cl. ......................................... 4/393; 4/379; 4/382; 4/388; 4/391; 4/392
[58] Field of Search ............... 4/393, 392, 368, 378, 4/379, 382, 383, 385, 391, 388

[56] References Cited

U.S. PATENT DOCUMENTS

| 1,128,980 | 2/1915 | Hobble | 4/393 |
| 2,773,268 | 12/1956 | Hurko et al. | 4/393 X |
| 3,003,156 | 10/1961 | Alexander | 4/393 |
| 3,142,846 | 8/1964 | Lackenmaier et al. | 4/393 |
| 3,302,217 | 2/1967 | Schrock | 4/393 |
| 3,561,012 | 2/1971 | Szymanski | 4/393 |
| 3,959,828 | 6/1976 | Acevedo | 4/393 |

Primary Examiner—Henry K. Artis
Attorney, Agent, or Firm—Sim & McBurney

[57] ABSTRACT

This invention provides an attachment for use with a flush toilet mechanism with the usual stopper and a cylindrical float member horizontally disposed, both being fixed with respect to each other and being swingable about a horizontal axis parallel with the cylinder axis. The attachment effects a saving of water used in flushing, and includes an upwardly open receptacle pivotally mounted with respect to a frame element, the latter being attached to the flush toilet mechanism such that the vertical location of the frame element with respect to the flush toilet mechanism can be selectively adjusted.

9 Claims, 5 Drawing Figures

FLUSH TOILET ACCESSORY

This invention relates generally to flush toilets, and has to do particularly with an accessory which may be applied to flush toilets incorporating valve-closed outlets, and which will reduce or restrict the amount of water required per flush.

Many flush toilet designs, particularly on the North American continent, have traditionally provided for a flushing operation in which, most of the time, considerably more water than the minimum necessary is utilized to evacuate the toilet bowl. This traditional design stems from an era in which water was readily and cheaply available.

Currently, however, certain densely populated areas and municipalities are experiencing shortages or curtailment of the water supply, accompanied by rising costs of supplying water, and it would be of advantage to provide some instrumentality by which new and exsiting flush toilets may be adapted to use a smaller amount of water to evacuate the toilet bowl.

Despite the desirability of utilizing a smaller amount of water to evacuate the toilet bowl, however, it is nonetheless of advantage to be able to employ the standard or full head of water for the flushing action which is provided by the original or traditional design of the reservoir tank. By utilizing the traditional full head of water in the reservoir tank, a strong and vigorous flushing action can be attained.

This invention addresses itself to the foregoing disadvantages of conventional flush toilet design.

More specifically, this invention is directed to the provision of an attachment which may be applied to a particular kind of flush assembly currently in use, namely that illustrated and described in U.S. Pat. No. 2,773,268, issued Dec. 11, 1956 to B. Hurko et al.

There are a variety of presently employed configurations for the Hurko valve assembly, and it is an aspect of this invention to provide an attachment which adapts readily to several different configurations.

It is a further aspect of this invention to provide an attachment allowing the saving of water, the construction of the attachment being such that the amount of water saved per flush may be selected by the user.

Accordingly, this invention provides, for use with a flush toilet mechanism having a valve member adapted to open and close a flush tank water outlet, and a cylindrical float member disposed with its axis horizontal, the valve member and the float member being fixed with respect to each other and being swingable about a horizontal axis parallel with the cylinder axis and spaced from both said members, the cylindrical float member being supported by a plate member parallel with the cylinder axis and having edges spaced inward from the ends of the cylindrical float member, an attachment for effecting a saving of water used in flushing, the attachment comprising: upwardly open receptacle means pivotally mounted on a frame element and adapted to be selectively set at a plurality of different orientations with respect to the frame element, and means for attaching the frame element to the flush toilet mechanism such that the vertical location of the frame element with respect to the flush toilet mechanism can be selectively adjusted.

One embodiment of the attachment of this invention is illustrated in the accompanying drawings, in which like numerals denote like parts throughout the several views, and in which.

Figure 1:
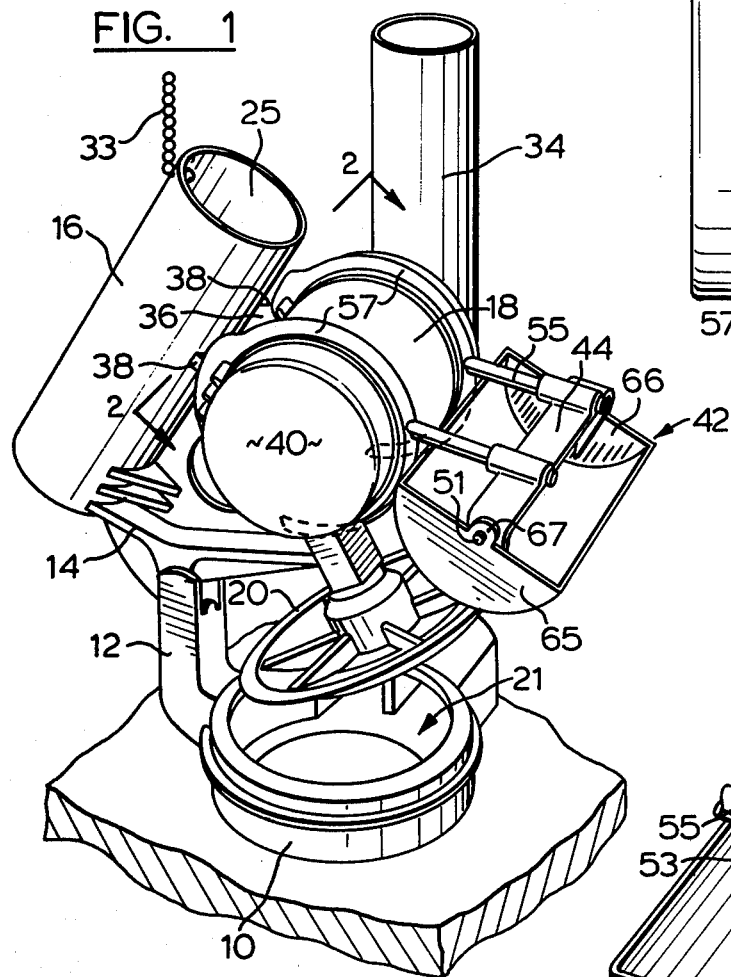
FIG. 1 is a perspective view of the Hurko-type valve assembly to which the attachment of this invention has been applied.

Attention is directed to FIG. 1 which shows a conventional flushing assembly, namely that described in the Hurko U.S. Pat. No. 2,773,268, to which the attachment of this invention has been applied.

The conventional arrangement will be referred to as the Hurko assembly hereinafter, and in FIG. 1 this is seen to include an outlet fixture 10, an upstanding support element 12 integral with the fixture 10, a rocker arm 14 pivotally mounted with respect to the upper end of the support element 12, a cylindrical reservoir member 16 fixed to the rocker arm 14 with its cylindrical axis parallel with the plane in which the rocker arm 14 pivots, and a cylindrical float member 18 also fixed with respect to the rocker arm, the cylindrical float member 18 having its cylindrical axis transverse to the plane in which the rocker arm 14 pivots. The rocker arm 14 also supports a valve member 20 which is adapted to close the opening 21 defined by the fixture 10.

Figure 4:
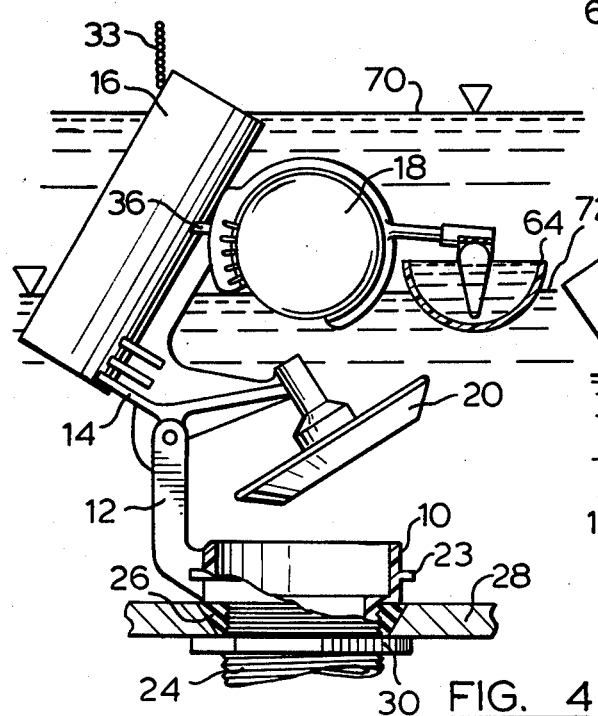
FIGS. 4 and 5 are elevational and partly sectional views of the apparatus in FIG. 1, at different stages during a single flushing procedure.
Figure 5:
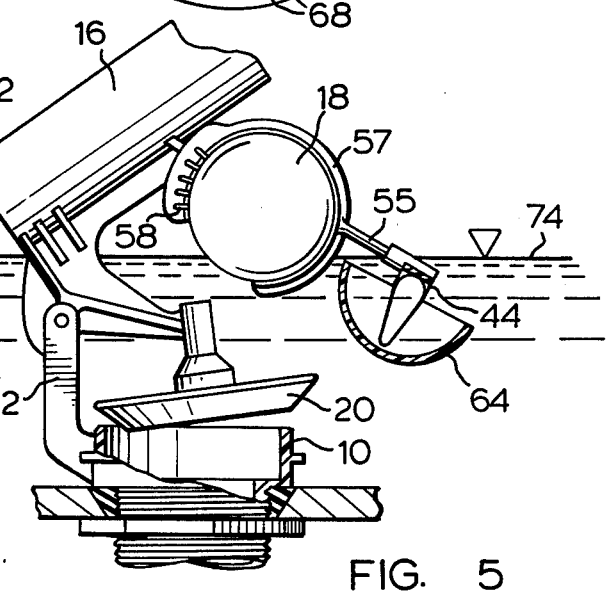

As can be seen particularly in FIGS. 4 and 5, the fixture 10 has an intermediate, outwardly-extending ledge 23, and is integral with a downwardly projecting threaded pipe portion 24. A wedge-shaped sealing member 26 is provided at the top of the pipe portion 24 and is adapted to cooperate with an opening in the bottom 28 of a porcelain flush tank of the usual variety. A plastic nut 30 is adapted to thread onto the pipe portion to secure the entire assembly in place inside a flush tank, and simultaneously to put compressive pressure on the sealing member 26 so that a proper water-tight seal may be effected with the bottom wall 28 of the flush tank.

Returning to FIG. 1, the reservoir member 16 has an open top end 25 and a closed bottom end except for a small aperture (not see in the FIGS.), which allows water initially collected in the reservoir member gradually to leak out. By contrast, the float member 18 is hollow and is entirely sealed so that no water can enter it.

The reservoir member 16 has a chain 33 attached to it as shown at upper left in FIG. 1. When an upward pull is exerted on the chain 33 by the usual lever-arm arrangement mounted on the tank wall (not shown), upward force is exerted at the top of the reservoir member 16, which causes the rocker arm 14 to rotate in the counter-clockwise direction thus lifting the valve member 20 off the opening 21 and allowing water to flow out of the flush tank.

Also shown in FIG. 1 is the usual standpipe 34, which in the Hurko assembly is provided along with the remaining parts as a single unit.

Figure 2:
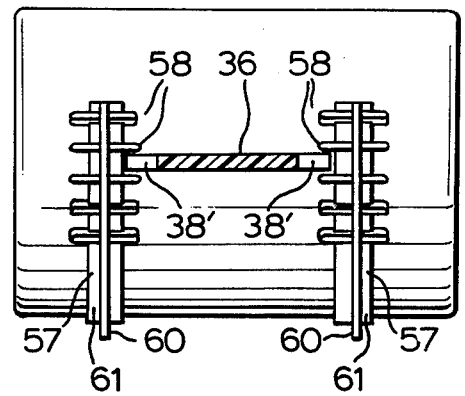
FIG. 2 is a sectional view taken at the line 2—2 in FIG. 1.

The cylindrical float member 18 is supported by a plate member 36 which lies parallel with the cylinder axis and which has side edges 38 which are spaced inwardly from the ends 40 of the cylindrical float member 18. Each edge 38 of the plate member 36 has an upper portion at right-angles to the axis of the cylindrical float member 18 (this being seen in the nearer side edge in FIG. 1), and a lower portion which diverges downwardly and outwardly to meet the surface of the cylindrical float member 18 (this being seen in the far edge in FIG. 1). In FIG. 2 the outwardly diverging portions of the edges 38 are identified as 38'.

The attachment of this invention includes an upwardly open receptacle means generally shown at the numeral 42, which is pivotally mounted with respect to a frame element 44 and is adapted to be selectively set at a plurality of different orientations with respect to the frame element 44. More specifically, the frame element 44 is elongated parallel to the axis of the cylindrical float member 18, and as best seen in FIG. 3, has two downwardly projecting finger members 46 and 47, each of which has at its lower end a protuberance 49 the purpose of which will subsequently be described.

Figure 3:
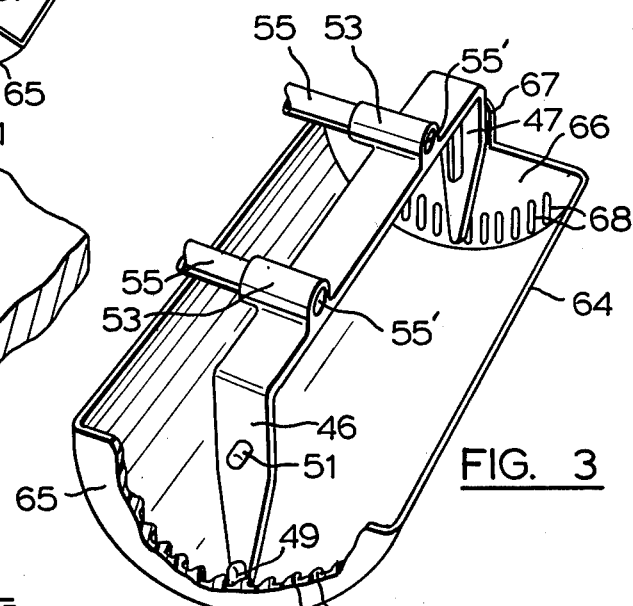
FIG. 3 is a partly broken-away view, to a larger scale, of one of the components of the attachement of this invention.

At an intermediate location on each of the finger members 46 and 47 there is an outwardly projecting pin 51 (only one pin 51 being visible in FIG. 3). The frame member 44 has two upwardly projecting integral journal portions 53 which receive the ends of rod-like support members 55. The rod-like support members 55 are not intended to rotate with respect to the journal portions 53, and indeed could be manufactured integrally with the frame member 44 if manufacturing techniques permitted. In a preferred method of assembly, these portions are made separately, and then the support members 55 are inserted into the journal portions 53 with a tight or snap fit.

The rod-like support members 55 are part of means for attaching the frame element 44 to the flush toilet mechanism described earlier, and in particular to the cylindrical float member 18, in such a way that the vertical location of the frame element 44 with respect to the flush toilet mechanism can be selectively adjusted. To accomplish the selective adjustment of the vertical position, there are provided two penannular hoop members 57 which are adapted to partially encircle the cylindrical float member 18 adjacent either edge of the plate member 36. Each hoop member 57 has registry means for interacting with the plate member 36 to define a plurality of selectable positions of the hoop members 57 with respect to the plate member 36. More particularly, the registry means is constituted by a plurality of lugs 58 which extend laterally inwardly from the hoop members 57. As seen in FIG. 2, each hoop member 57 supports five lugs which extend to either side of the particular hoop member 57. The lugs 58 have lower or inner surfaces which lie on the same cylindrical surface as the inner surface of the hoop members 57, and therefore bear inwardly against the cylindrical float member 18. Each hoop member 57 has a T-shaped cross section which is inverted so that the cross bar of the "T" lies flat against the cylindrical surface of the float member 18, and the stem of the "T" extends upwardly away from the surface. The stem is identified in FIG. 2 by the numeral 60, while the cross bar of the "T" is identified by the numeral 61.

The lugs 58 extend to either side of each hoop member so that they apply against the surface of the float member 18 over a greater width, thus contributing to the stability of the hoop member attachment.

As can be particularly well seen in FIG. 2, each adjacent pair of lugs 58 is spaced apart by a distance which is substantially the same as the thickness of the plate member 36. This allows the lower edge of the plate member 36, where it contacts the surface of the float member 18, to be received between an adjacent pair of lugs 58, thereby determining the rotational position of the hoop members 57 with respect to the float member 18. The hoop members, although resilient, can be distorted quite easily by the fingers to allow the plate member 36 to be inserted between other pairs of the lugs 58.

The support members 55 extend integrally outward from the hoop members 57, as best seen in FIG. 1, and thus once the lugs 58 have closed around the plate member 36 in a particular position, the location of the frame member 44 with respect to the cylindrical float member 18 is definitely determined.

As particularly well seen in FIGS. 1 and 3, the receptacle means which cooperates with the frame member 44 is constituted by a semi-cylindrical trough 64 with semi-circular end walls 65, 66. Each end wall 65, 66 has an upwardly extending integral tab 67 which defines an aperture located substantially at the centre of curvature of the semi-cylindrical trough 64, the pins 51 being received in these apertures. The two finger members 46 and 47 project to the inside of the respective end walls 65 and 66, and are made such that the protuberances at the bottoms of the fingers bear outwardly against the lower part of each of the end walls 65 and 66. Each end wall has, bordering its lower inner margin, a plurality of spaced-apart ribs 68 which provide intermediate recesses in any one of which the respective protuberance can lodge. This allows the angulation of the semi-cylindrical trough 64 with respect to the frame member 44 to be adjusted.

The operation of the device may be visualized by referring to FIGS. 4 and 5.

Prior to the flushing of the flush tank, the water level may be that shown by the dashed line 70 in FIG. 4. The main apparatus would not be in the position of FIG. 4 prior to the flush, but would be rotated in the clockwise direction so that the valve 20 were in sealed relationship with the opening fixture 10.

Upon initiation of the flush, the portions affixed to the rocker arm 14 would be rotated in the counterclockwise direction to the position shown in FIG. 4, and water would begin to exit through the opening fixture 10.

As can be seen in FIG. 4, the setting of the trough 64 is such that, when the remainder of the apparatus is in the position of FIG. 4, the trough is oriented to hold the most amount of water. As the water level in the tank moves downwardly down past the trough 64 to about the position shown by the solid line 72, the additional weight of the water in the trough 64 will exert a clockwise closing torque on the remainder of the apparatus secured to the rocker arm 14, and the valve member 20 will begin to move downwardly toward the opening fixture 10. As is well known, as soon as the valve member 20 approaches closer than a certain threshold point to the opening fixture 10, the differential water pressure above and below the valve 20 due to the movement of the water will add even more closing torque and the valve will snap suddenly into a closed position.

FIG. 5 shows the valve 20 in the last split second before closing, and it will be noted that the water level 74 is still well above the location of the outlet fixture 10.

The provision of the adjustability feature for the hoop members 57 and for the trough 64 is made to allow the user to select the amount of water retained by the trough 64 and thus the extent of the closing torque applied by the retained water, and also to permit the attachment provided herein to be affixed to differing models of the basic conventional apparatus which is seen in FIG. 1. In the different models, the exact position of the support plate 36 with respect to the remaining parts of the apparatus can change, and this is one of the reasons for the provision of multiple setting positions of the hoop members 57 with respect to the cylindrical float member 18. For any one model of the conventional apparatus, the provision of the hoop member adjustability will also allow a certain additional control over the timing of the closure of the valve 20.

What we claim is:

1. For use with a flush toilet mechanism having a valve member adapted to open and close a flush tank water outlet, and a cylindrical float member disposed with its axis horizontal, the valve member and the float member being fixed with respect to each other and being swingable about a horizontal axis parallel with the cylinder axis and spaced from both said members, the cylindrical float member being supported by a plate member parallel with the cylinder axis and having edges spaced inward from the ends of the cylindrical float member, an attachment for effecting a saving of water used in flushing, the attachment comprising:

upwardly open receptacle means pivotally mounted on a frame element and adapted to be selectively set at a plurality of different orientations with respect to the frame element, and means for attaching the frame element to the flush toilet mechanism such that the vertical location of the frame element with respect to the flush toilet mechanism can be selectively adjusted.

2. The attachment claimed in claim 1 in which said means for attaching includes two penannular hoop members adapted to partially encircle the cylindrical float member adjacent either edge of said plate member, at least one hoop member having registry means for interacting with the plate member to define a plurality of selectable positions of said at least one hoop member with respect to the plate member, and support members from said hoop members to said frame element.

3. The attachment claimed in claim 2, in which the registry means includes a plurality of lugs extending laterally from said at least one hoop member, each adjacent pair of lugs being spaced apart by a distance substantially the same as the thickness of the plate member.

4. The attachment claimed in claim 3, in which both hoop members have a plurality of lugs as defined.

5. The attachment claimed in claim 1, in which the frame element is elongated parallel to the axis of the cylindrical float member, and has two pins cooperating with apertures on the receptacle means to allow the latter to pivot.

6. The attachment claimed in claim 5, in which the frame element further has at least one downwardly projecting finger member supporting a protuberance resiliently urged against an irregular wall of the receptacle means.

7. The attachment claimed in claim 6, in which the receptacle means is a semi-cylindrical trough with semi-circular end walls, said apertures being located in said end walls substantially at the center of curvature of the semi-cylinder, and in which the finger member projects to the inside of one end wall and bears outwardly thereagainst, the said one end wall having a plurality of spaced-apart ribs providing intermediate recesses in any one of which said protuberance can lodge.

8. The attachment claimed in claim 7, in which there are two said fingers, one inwardly adjacent each end wall.

9. The attachment claimed in claim 4, in which the receptacle means is semi-cylindrical trough with semi-circular end walls, the frame element being elongated parallel to the axis of the cylindrical float member and having two pins cooperating with apertures in said end walls to allow the receptacle means to pivot, the apertures being located substantially at the center of curvature of the semi-cylinder, the frame element further having two downwardly projecting finger members, each supporting a protuberance resiliently urged against one of the end walls of the trough, each finger member being to the inside of its respective end wall and bearing outwardly thereagainst, each end wall having a plurality of spaced-apart ribs providing intermediate recesses in any one of which the respective protuberance can lodge.

* * * * *